United States Patent
Buchanan, Jr. et al.

[11] Patent Number: 6,148,470
[45] Date of Patent: Nov. 21, 2000

[54] WINDSHIELD WIPING SYSTEM

[75] Inventors: Harry C. Buchanan, Jr.; Yaomin Dong, both of Dayton, Ohio

[73] Assignee: Valeo Electrical Systems, Inc., Auburn Hills, Mich.

[21] Appl. No.: 09/134,266

[22] Filed: Aug. 14, 1998

[51] Int. Cl.⁷ .................................. B60S 1/24; B60S 1/18
[52] U.S. Cl. ................. 15/250.31; 15/250.3; 15/250.27; 74/43; 74/581; 74/584; 403/2
[58] Field of Search .................. 15/250.3, 250.27, 15/250.31, 250.13, 250.16; 74/581, 582, 42, 43, 584; 403/2

[56] References Cited

U.S. PATENT DOCUMENTS

| | | | |
|---|---|---|---|
| 987,760 | 3/1911 | Spellings | 74/581 |
| 1,313,764 | 8/1919 | Thurston | 74/581 |
| 1,448,517 | 3/1923 | Brady . | |
| 2,259,790 | 10/1941 | Auten | 15/250.31 |
| 2,744,282 | 5/1956 | Dyer et al. | 15/255 |
| 3,688,333 | 9/1972 | Cimino et al. | 15/250.31 |
| 4,689,535 | 8/1987 | Tsunoda et al. | 318/443 |
| 4,736,487 | 4/1988 | Epple et al. | 15/250.31 |
| 5,023,532 | 6/1991 | Gakenholz | 318/541 |
| 5,050,442 | 9/1991 | Reed | 15/250.31 |
| 5,117,168 | 5/1992 | Nomura et al. | 318/444 |
| 5,241,248 | 8/1993 | Furukoshi | 318/443 |
| 5,245,259 | 9/1993 | Nakamura et al. | 318/443 |
| 5,404,085 | 4/1995 | Resch et al. | 318/443 |
| 5,430,908 | 7/1995 | Deng | 15/250 |

Primary Examiner—Gary K. Graham
Attorney, Agent, or Firm—Jacox, Meckstroth & Jenkins

[57] ABSTRACT

This invention relates to windshield wiper system and method which utilizes a flexible member to account for compression loads in excess of a predetermined load, such as 30 percent greater than a maximum load for the flexible member. The system utilizes a flexible pultruded composite material having a relatively low modulus of elasticity, yet relatively high elongation characteristics. The flexible arm bends to facilitate preventing damage to components in the wiper system when a compressive load applied to the flexible member reaches a predetermined load as a result of a fatigue condition, such as snow or ice build up on the windshield. In one embodiment, the predetermined load is defined as:

$P_{CR} = KE = 1.3 P_{link}$; where:

$P_{CR}$ = the predetermined load;

$P_{link}$ = a maximum normal running load for a comparably-sized steel or rigid link which does not flex;

K is a coefficient=

$$K \text{ is a coefficient} = \frac{\pi^2 I}{L^2};$$

E is the flexural modulus (MPa)
and I is a moment of inertia in mm⁴
and L is a length (mm) of flexible arm 28.

20 Claims, 7 Drawing Sheets

A — MOLDED GLASTIC LAMINATE
B — MOLDED APOXY RESIN
C — PULTRUDED POLYESTER (ORIENTED FIBERS)
D — PULTRUDED POLYESTER (UNIDIRECTIONAL FIBERS)

WINDSHIELD WIPING SYSTEM

BACKGROUND OF THE INVENTION

1. Field of the Invention

This invention relates to a windshield wiper system and, more particularly, to a windshield wiper system which utilizes at least one flexible member which bends or flexes to compensate for compression loads in excess of a predetermined load.

2. Description of the Related Art

In the field of windshield wiper systems, wiper arms having wiper blades thereon are driven from a park position, where the blades are often situated at either the bottom of or below a windshield of a vehicle, through an inwipe position, to an outwipe position. During normal wiping operations, the blades oscillate between the inwipe and outwipe positions to clean the windshield of debris or particles, such as ice, snow or other debris. It is not uncommon that snow or ice can accumulate on the windshield and prevent the wiper blades from, for example, fully retracting from the inwipe position to the park position when a user actuates a wiper switch to an off position.

When the debris blocks the wiper arms and blades, a considerable amount of stress is imparted on the wiper linkage and drive motor which drives the blades. For example, a motor drive link, which couples the drive shaft of the motor to the drive linkage which drives the wiper arms, often experiences a compressive force. The linkage members of the wiper systems have in the past been stiffened to reduce expansion and shrinkage in order to avoid changing the wipe pattern requirements for the vehicles. However, in freezing, snowy weather, the snow and ice packs at the bottom of the windshield causes a restriction in the movement in the wiper arm and blade. Because of the rigidity of the motor drive link, the housing which houses the drive gears of the drive motor may crack or break. It has also been experienced that one or more drive plates which directly or indirectly couple the drive link to other linkage have been known to fracture or crack.

Accordingly, what is needed is a simple, yet effective, linkage system which utilizes one or more linkage arms having a relatively low modulus of elasticity with relatively high elongation and fatigue properties to facilitate avoiding the problems of the past.

SUMMARY OF THE INVENTION

It is, therefore, a primary object of the invention to provide a system and method for driving a windshield wiper blade such that it can accommodate relatively high loads resulting from undesired fatigue conditions.

It is another object of the invention to provide a wiper blade linkage system which utilizes at least one flexible arm which is capable of flexing when a compressive load exceeds a predetermined amount, such as 30 percent higher than a maximum working load.

It is another object of the invention to provide a system and method which can accommodate for compressive loads on linkage components resulting from fatigue conditions, such as snow or ice situated on a windshield.

In one aspect, this invention comprises a windshield wiper drive linkage for use in a wiper system comprising a plurality of linkage arms, at least one of the plurality of linkage arms comprising a flexible arm which bends to facilitate preventing damage to components in the wiper system when a compressive load applied to at least one of the plurality of linkage arms exceeds a predetermined load as a result of a fatigue condition.

In another aspect, this invention comprises a wiper system comprising a first wiper, a second wiper, a windshield wiper drive linkage coupled to the first and second wipers, a drive motor coupled to the windshield wiper drive linkage and the windshield wiper drive linkage comprising a plurality of linkage arms coupled to the first and second wipers and the drive motor, at least one of the linkage arms comprising a flexible arm which bends to facilitate preventing damage to components in the wiper system when a compressive load applied to one linkage arms exceeds a predetermined load as a result of a fatigue condition.

In yet another aspect, this invention comprises a method of driving at least one wiper blade in a windshield wiper system comprising the steps of providing a drive motor for driving the at least one wiper blade, providing linkage for linking at least one wiper blade to the drive motor, the linkage comprising a flexible arm which bends to facilitate preventing damage to components in the wiper system when a compressive load applied to at least one linkage arms exceeds a predetermined load as a result of a fatigue condition.

Other objects and advantages of the invention will be apparent from the following description, the accompanying drawings, and the appended claims.

DETAILED DESCRIPTION OF THE PREFERRED EMBODIMENTS

Referring now to FIGS. 1 and 2A–2D, a windshield wiper system 10 is shown comprising a first wiper 12 and a second wiper 14 for wiping a windshield 16. The wiper 12 comprises a wiper arm 12a and blade 12b, and wiper 14 comprises a wiper arm 14a and blade 14b.

The wiper system 10 further comprises a windshield wiper drive linkage or linking means 18 comprising a first link arm 18 on which a drive motor 20 is fastened thereto by conventional means, such as a weld, nut and bolt, or the like. Notice that the frame link 18 comprises a first pivot housing 21 and a second pivot housing 21 which is secured thereto. The pivot housings 20 and 22 comprise a first rotatable pivot housing shaft 21a and a second rotatable pivot housing shaft 22a which are drivingly coupled to wiper arms 12a and 14a (shown in phantom in FIG. 1), respectively.

Figure 1:
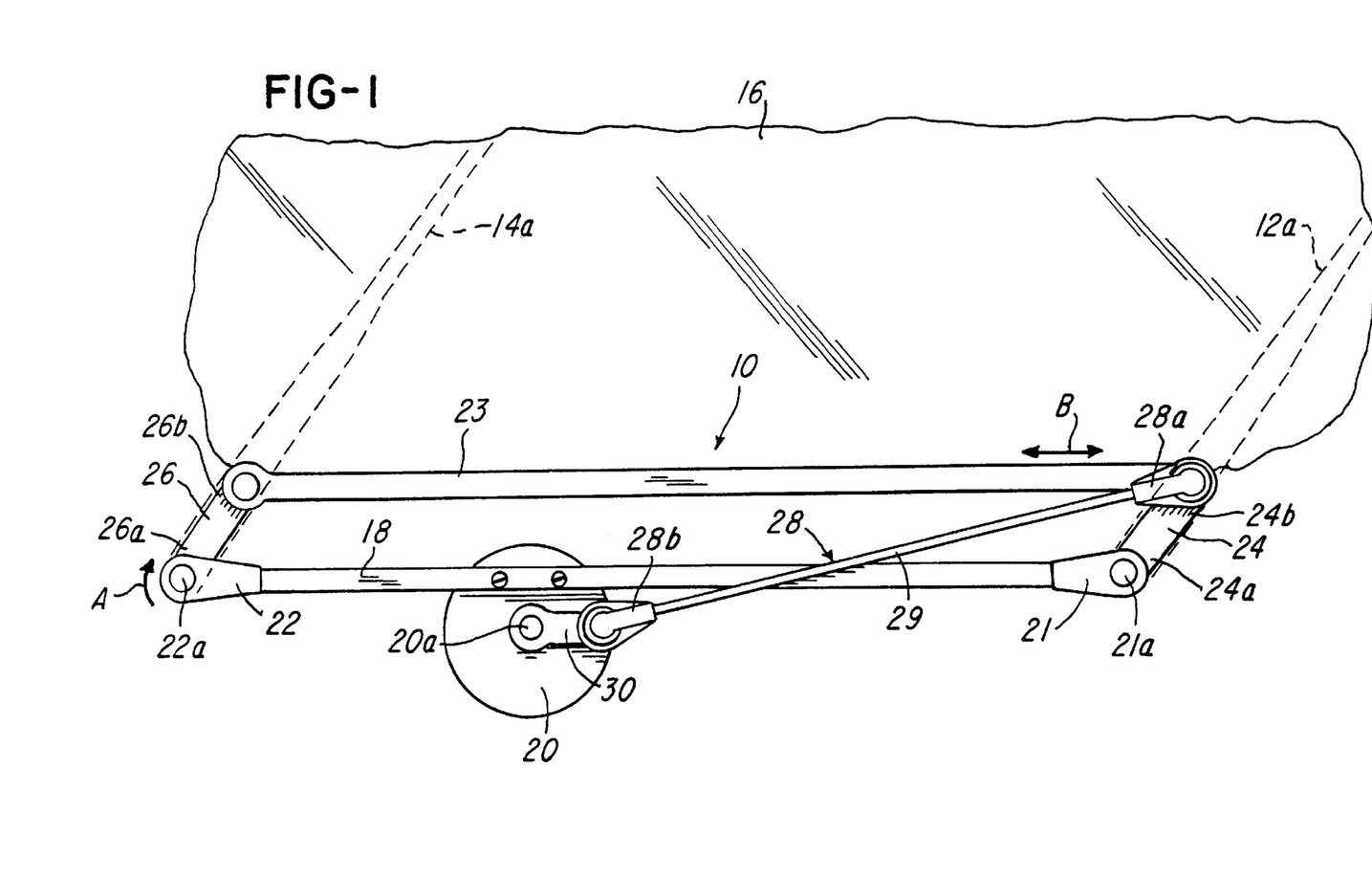
FIG. 1 is a general schematic view of a wiper blade drive and linking system in accordance with one embodiment of the invention.

The first rotatable pivot housing shaft 21a is coupled to a first end 24a of a drive plate 24. Likewise, the pivot housing shaft 22a is secured to a first end 26a of a second drive plate 26, as best illustrated in FIG. 1. An operating or "slave" link 23 couples a second end 24b of first drive plate 24 to a second end 26b of second drive plate 26 such that the drive plates 24 and 26 operate synchronously to rotatably drive the pivot housing shafts 21a and 22a in the direction of arrow A, thereby driving the wiper blades 12b and 14b.

The linkage or linking means 18 further comprises a motor drive link or flexible arm 28 having a first end 28a coupled to the second end 24b of the drive plate 24. The motor drive link or flexible arm 28 further comprises a second end 28b which is coupled to an output shaft 20a of motor 20 via a crank arm 30. In this regard, the crank arm 30 comprises a crank arm ball (not shown) and the drive plate 24 comprises a drive plate ball (not shown).

The arm 28 comprises an elongated rectangular member 29 (FIGS. 3–5) comprising a socket 32 and socket 34 which are over-molded thereon. As best illustrated in FIGS. 3–6, the first end 28a of motor drive link or flexible arm 28 comprises the socket 32 for mounting onto the drive plate ball (not shown) on drive plates 24, and second end 28b of motor drive link or flexible arm 28 comprises the socket 34 for receiving crank arm ball (not shown) on crank arm 30. As best illustrated in FIGS. 3–7, the first and second ends 28a and 28b comprise the sockets 32 and 34, respectively. Notice that socket 32 (FIG. 6) defines a socket area 40, respectively. It has been found that it is desirable to align the centerline CL (FIG. 5) with the axis of shafts 20a, 22a and 24a when the wipers 12 and 14 are in the park position.

As best illustrated in FIGS. 2A–2C and 3, flexible arm 28 defines a length L1, which in the embodiment being described is in excess of 250 mm. During a fatigue condition, when the compressive load applied to the arm 28 exceeds a predetermined load (such as at least 30 percent of a maximum working load of flexible member 28 as defined below), the flexible arm 28 begins to flex or bend. This causes the flexible arm 28 to shorten to a length L2, illustrated in FIG. 2D, and this length L2 is shorter than length L1. As illustrated in the graphs shown in FIG. 9 which are referred to and described later herein, the compressive load remains substantially constant as the flexible arm 28 continues to bend or flex and shorten for at least 5 mm after the compressive load achieves the predetermined load.

Figure 3:
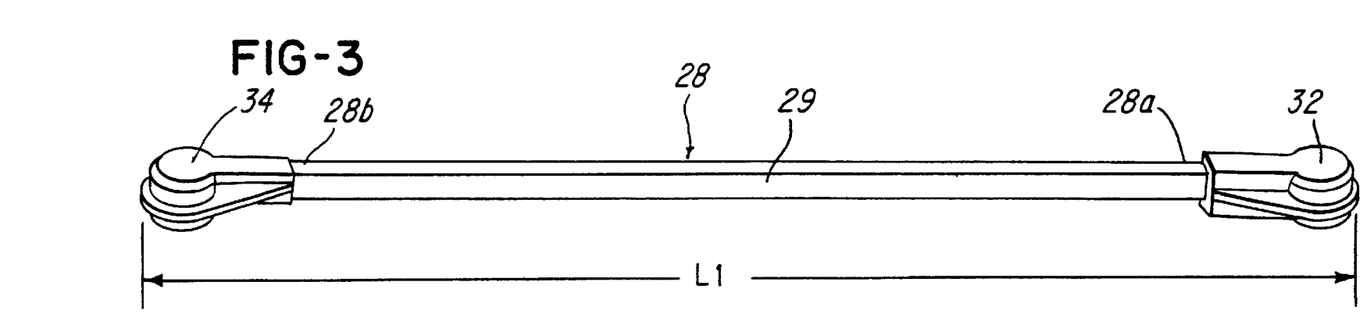
FIG. 3 is a perspective view of a flexible member in accordance with one embodiment of the invention.
Figure 4:
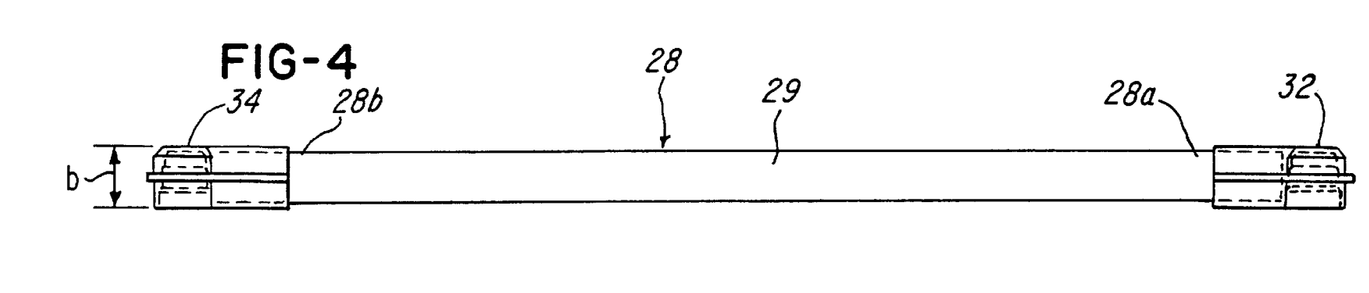
FIG. 4 is a front view of the flexible member shown in FIG. 3.
Figure 5:
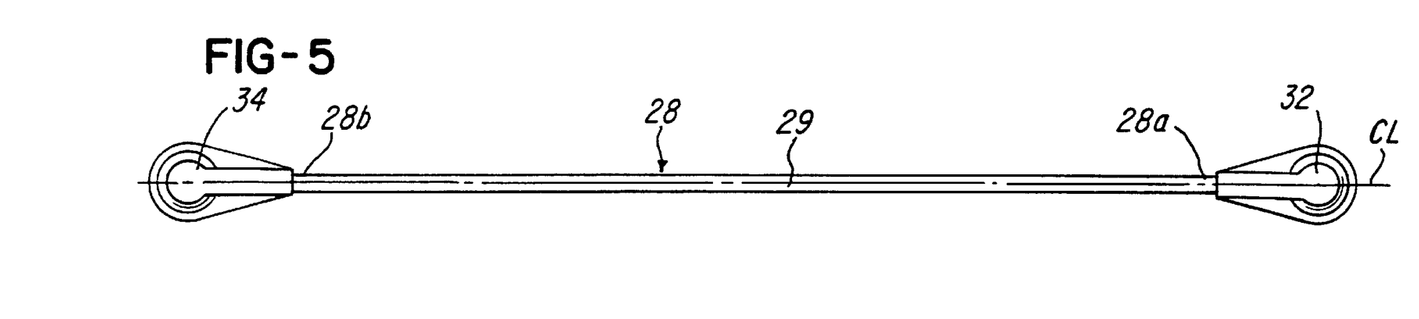
FIG. 5 is a plan view of the flexible member shown in FIG. 3.
Figure 6:
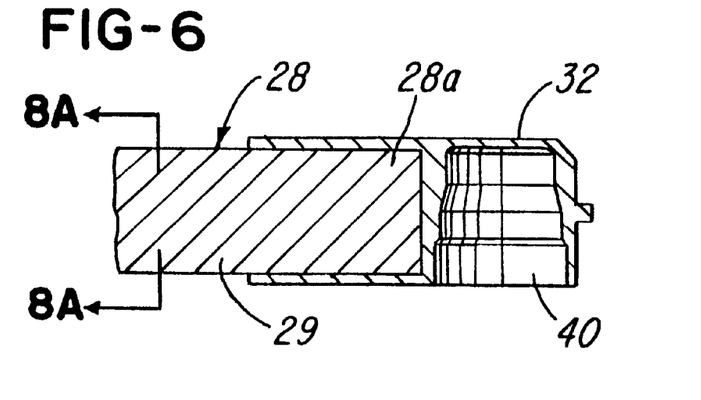
FIG. 6 is a fragmentary sectional view of an end cap situated on the flexible member.
Figure 8A:
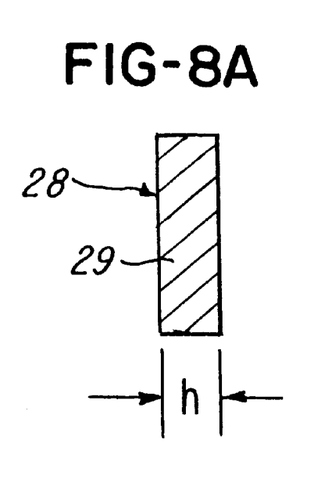
FIG. 8A is a sectional view taken along the line 8A—8A in FIG. 6.

As illustrated in FIGS. 3–5, the flexible arm 28 is preferably made from a composite material of the type described later herein relative to Table 1. As best illustrated in FIG. 8A, the flexible arm 28 is generally rectangular in cross-section and is generally elongated (FIGS. 3–5). It should be appreciated that the member 28 could be elliptical, circular or of some other geometry as desired. In the embodiment being described, the length L1 (FIGS. 2A and 3) of flexible arm 28 is on the order of at least 250 mm, but it could be any suitable length depending on the application.

Figure 7:
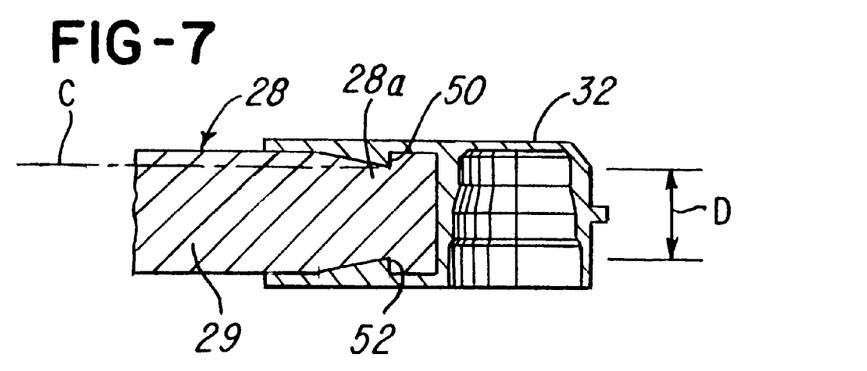
FIG. 7 is a view similar to FIG. 6 showing a plurality of shear areas to enable the cap to separate from the flexible member when a shear stress exceeds a predetermined amount.

FIG. 7 illustrates another embodiment of the invention where the flexible member 28 may be provided with sockets 32 and 34 with shear relief areas 50 and 52 which enable the end caps 32 and 34 to shear away or separate from member 29 when a predetermined stress applied to the flexible member 28. Preferably, the predetermined stress is selected to be just slightly below a break point or maximum load of the member 29 so that, when the member 29 is about to reach its break point, one or more of the sockets 32 or 34 are permitted to shear and separate themselves from member 29 to avoid breakage.

As illustrated in FIG. 7, line C defines a shear plane ($A_s$=lW) and a minimal cross section (AC=HW), as shown by line D in FIG. 7. The shear stress along shear plane should not exceed the shearing strength which is defined as follows:

$$T = \frac{P}{A_s} = \frac{P}{lW} \leq T_y$$

where:
A$_s$=lW;
L=a length of shear plane (line C);
W=a width of member 28;
P=a tensile load on member 28 as measured experimentally;
T=shear stress of member 28; and
T$_y$=yield shear stress of member 28.

A tensile stress on the minimum cross section should not exceed a yield stress as follows:

$$S = \frac{P}{A_c} = \frac{P}{HW} \leq S_y$$

Where:
S=a tensile stress of member 28;
S$_y$=a yield stress of member 28;
P=a tensile load on member 28 as measured experimentally;
H=a height of member 28; and
W=a width of member 28.

The general operation of the linkage 18 will now be described relative to FIGS. 1 and 2A–2D. When a user actuates a wiper switch (not shown) the drive motor 20 is energized to cause the wipers to move from a park position (PP) through an inwipe position (IWP) towards an outwipe position (OWP), back to the inwipe position and so on. When the user turns the switch to an off position (not shown), the drive motor 20 drives the crank arm 30 to drive the motor drive link or flexible arm 28 to attempt to drive wipers 12 and 14 from the inwipe position to the park position. The motor 20 rotatably drives crank arm 30 which, in turn, drives the motor drive link or flexible arm 28 to drive the second end 24b of drive plate 24 in the direction of arrow B in FIG. 1. The operating link 23 responds by directly driving second end 26b of drive plate 26. The movement of drive plates 24 and 26, in turn, rotatably drive the pivot housing shafts 21a and 22a, respectively, to drive the first and second wipers 12 and 14 across the face of windshield 16 in response to rotation of the motor drive shaft 20a.

Figure 2A:
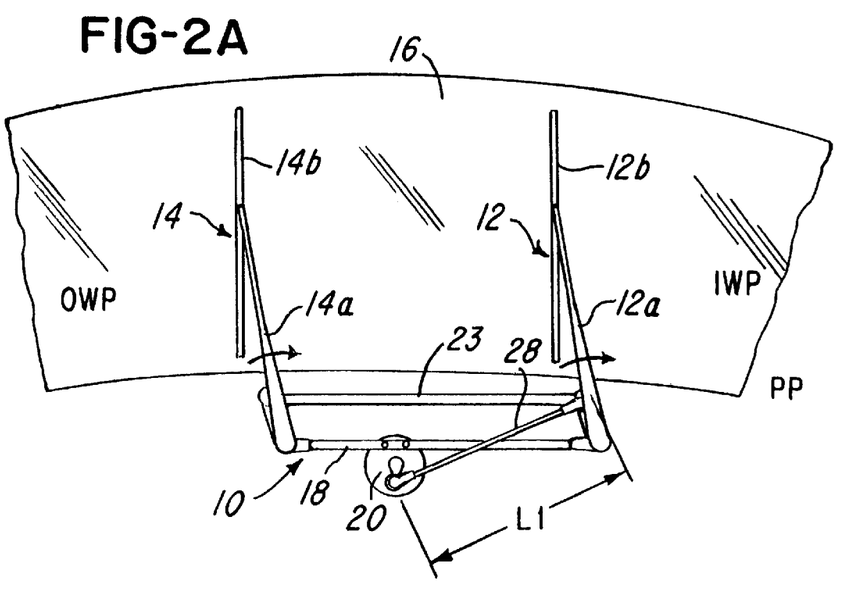
FIGS. 2A–2D are illustrations of the wiper blade assembly of FIG. 1 as it is driven from an outwipe position towards inwipe and park positions.
Figure 2B:
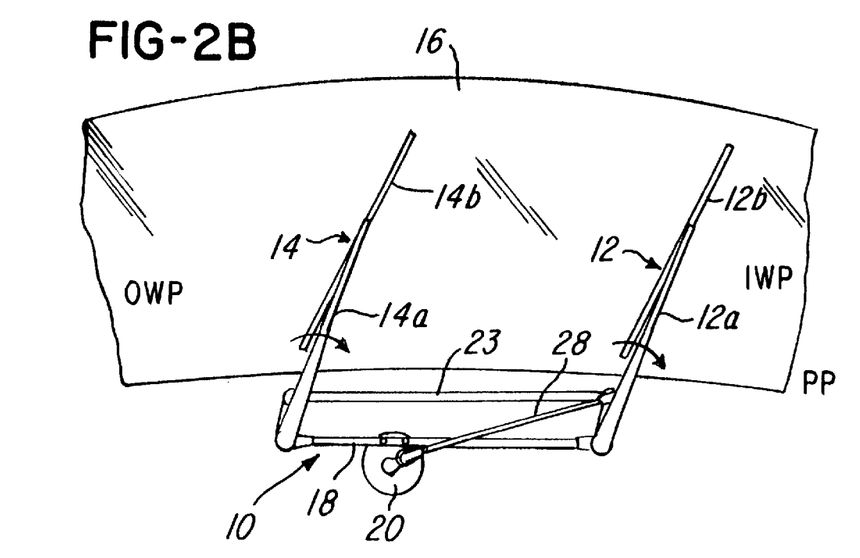
Figure 2C:
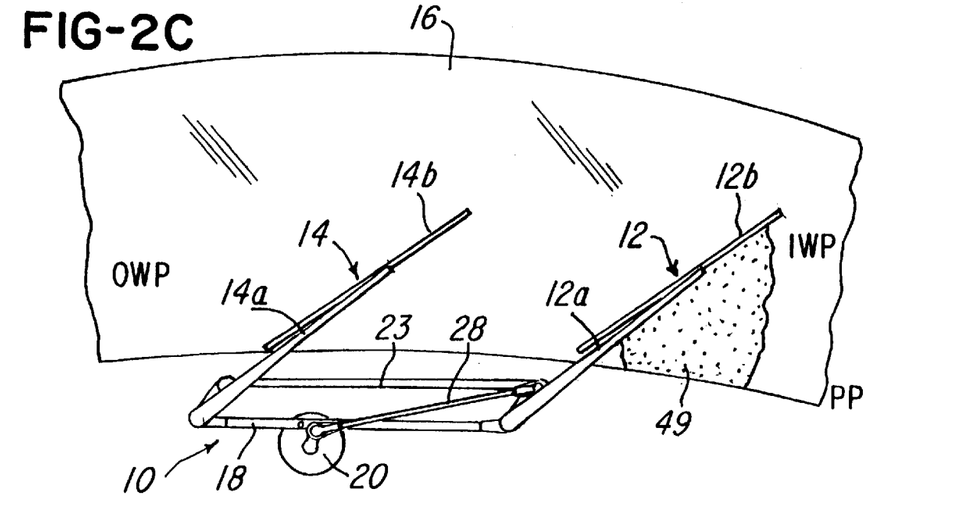
Figure 2D:
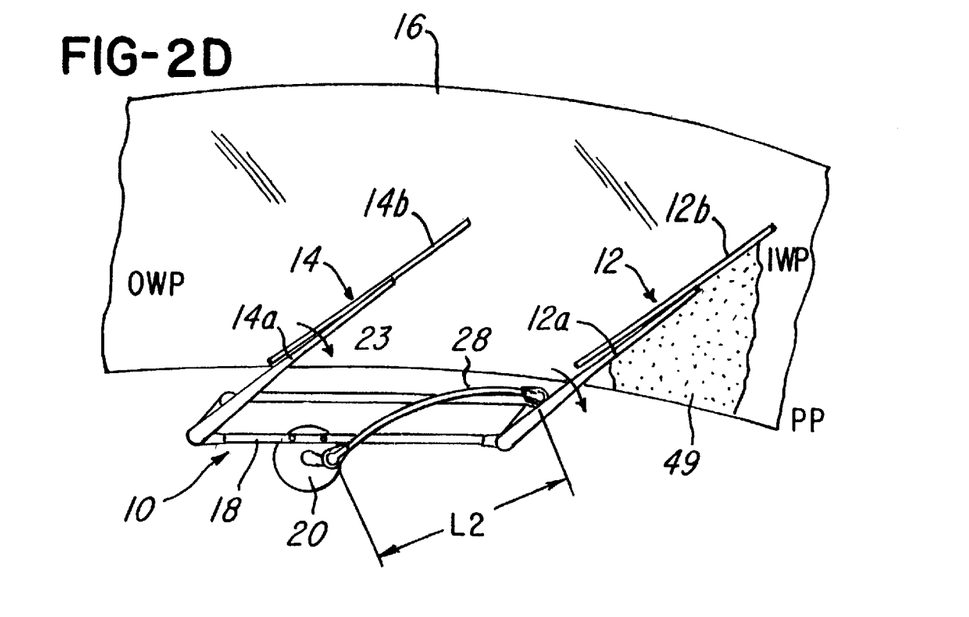

As best illustrated in the FIGS. 2C and 2D, a fatigue condition may occur when snow, ice or some other material or condition (illustrated as 49 in FIGS. 2C and 2D) prevents the wiper blades from moving, for example, from the inwipe position to the park position. However, the motor 20 continues to drive the motor drive link or flexible arm 28. Consequently, a compressive force or load is applied to the arm 28. The flexible arm 28 bends or flexes to facilitate preventing damage to the various components in the wiper system 10 when the load applied to the flexible arm 28 exceeds a predetermined load described later herein. Thus, it should be appreciated, that the flexible arm 28 flexes to accommodate the compressive force or load mentioned earlier when the compressive force or load exceeding the predetermined load as a result of the fatigue condition.

In the embodiment being described, it was determined empirically that, when the predetermined load was established is at least 130 percent or more of a maximum normal running load, the arm 28 remained rigid enough to handle the normal wiping, yet flexible enough to bend during fatigue conditions. Thus, when the predetermined load exceeds about 130 percent of the maximum normal running load for the flexible arm 28, the wiper system 10 was able to operate with maximum efficiency, while protecting the components of the system 10. In the embodiment described, the predetermined load is defined as follows:

$P_{CR}=KE=1.3P_{link}$; where:

$P_{CR}$=the predetermined load;

$P_{link}$=a maximum normal running load for a comparably-sized steel or rigid link which does not flex;

$$K \text{ is a coefficient} = \frac{\pi^2 I}{L^2};$$

E is the flexural modulus (MPa)

and I is a moment of inertia in mm$^4$ and L is a length (mm) of flexible arm 28.

Figure 8B:
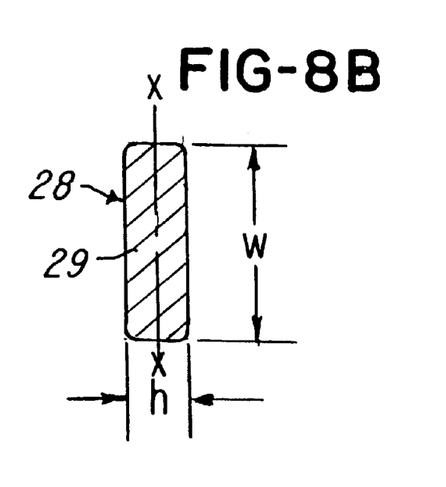
FIG. 8B is a sectional view similar to FIG. 8A showing a flexible member with rounded corners.

If the cross-sectional shape of member 28 is rounded on its edges as shown in FIG. 8B, then the formula for the area moment of inertia (I) is calculated using the following equation:

$$I = \frac{1}{12}w(h-2r)^3 + \frac{1}{6}r^3(b-2r) + \frac{1}{2}r(h-r)^2(b-2r)^2 + \frac{1}{4}\pi r^2[r^2 + (h-2r)^2];$$

where W, H and R are width, height and fillet radius, respectively, of the cross-section of member 28 shown in FIG. 8B.

Eight samples of composite material with dimensions as shown in Table 1 below were made and tested using an Instron testing machine. The load and displacement were recorded and the testing results are shown in Table 1 and in the graph illustrated in FIG. 9

TABLE 1

| Material | L1 (mm) (FIG. 3) | b (mm) (FIG. 4) | h (mm) (FIG. 8) | Pcrit-Exp.(N) | Pcrit-Theory(N) |
|---|---|---|---|---|---|
| 1. Glastic Laminate | | | | | |
| 1a. | 253 | 12.7 | 3.3 | 61.71 | 68.74 |
| 1b. | 253 | 19.09 | 3.3 | 94.96 | 103.33 |
| 1c. | 253 | 25.32 | 3.3 | 131.91 | 137.05 |

TABLE 1-continued

| Material | L1 (mm) (FIG. 3) | b (mm) (FIG. 4) | h (mm) (FIG. 8) | Pcrit-Exp.(N) | Pcrit-Theory(N) |
|---|---|---|---|---|---|
| 2. Epoxy Resin (IP) | | | | | |
| 2a. | 253 | 12.7 | 3.18 | 106.23 | 97.69 |
| 2b. | 253 | 19.09 | 3.18 | 206.52 | 146.85 |
| 2c. | 253 | 25.32 | 3.18 | 290.02 | 238.47 |
| 3. Polyester (NCC) | 300 | 20 | 3.4 | 290.02 | 238.47 |
| 4. Fiberglass | 305 | 31.7 | 2.42 | 237.98 | 219.10 |

As illustrated in Table 1, the four different composite materials included a molded glass laminate provided by Red Seal Electric Company of Cleveland, Ohio; a molded epoxy resin provided by International Paper of Hampton, S.C.; a protruded polyester with oriented glass fibers provided by National Composite Center of Dayton, Ohio; and a protruded polyester with uni-directional glass fibers provided by Polygon Company of Walkerton, Ind.

It should be apparent from the Table 1 that the actual loads (Pcrit-Exp.) compared vary favorably to theoretical loads (Pcrit-Theory).

Figure 9:
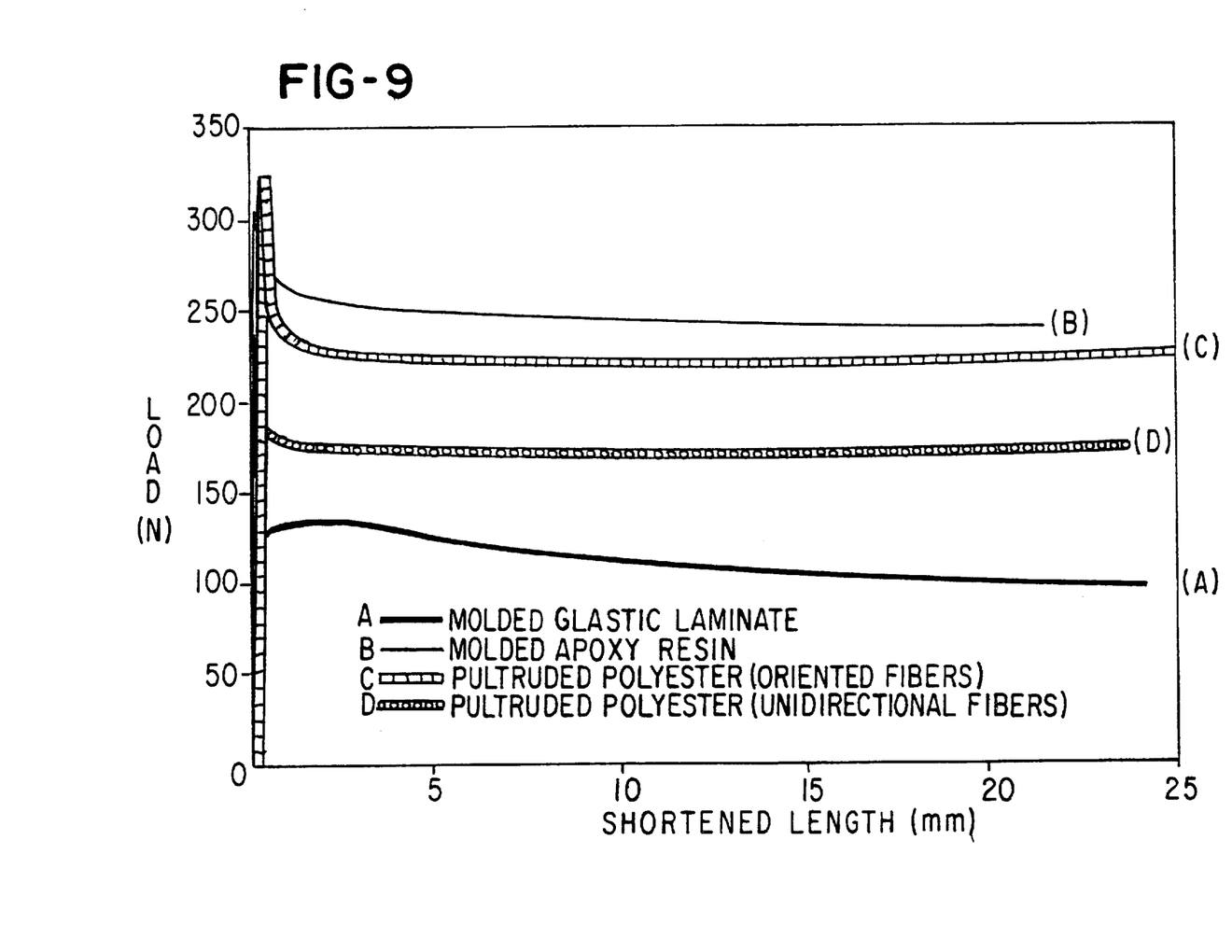
FIG. 9 is graphical representation of a relationship between a compressive load for the flexible member relative to the length of the member as it shortens and flexes when the compression load exceeds a predetermined amount.
Figure 10:
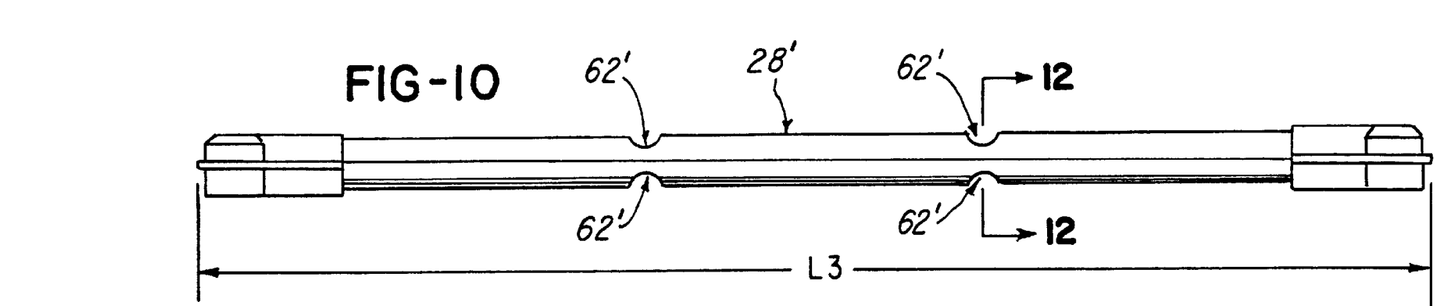
FIG. 10 is an illustration of another flexible member in accordance with another embodiment of the invention.
Figure 11:
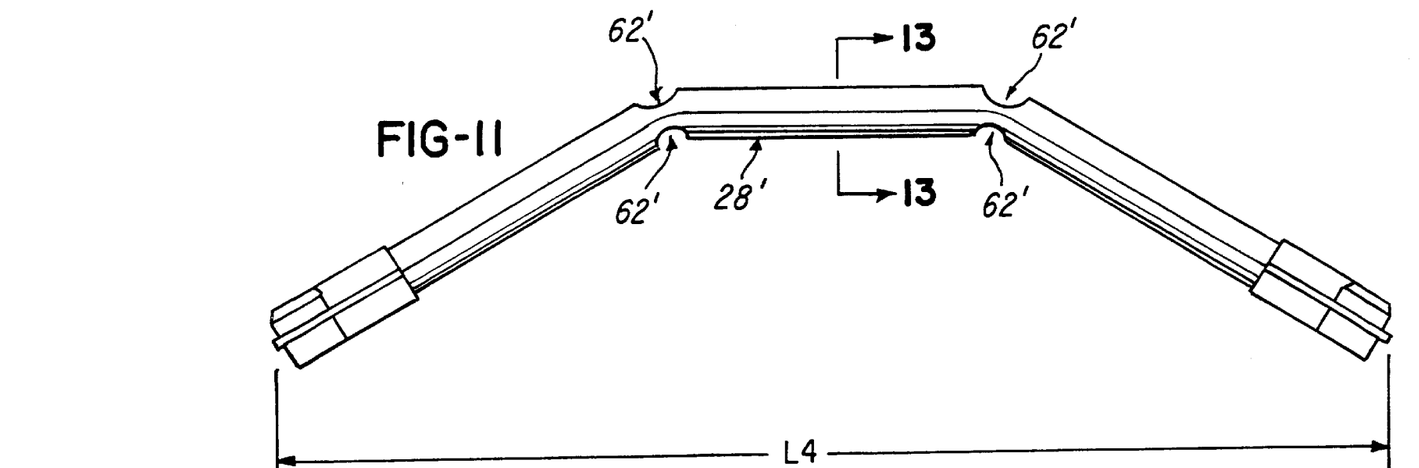
FIG. 11 is a illustration of the flexible member shown in FIG. 10 showing a shortened length L4.

FIG. 9 graphically illustrates the Instron testing machine results. Notice that, as the load on compressive arm 18 increased to in excess of 300 Newton, the flexible arm 18 began to bend or flex (as shown in FIG. 2D), thereby causing the load to be distributed across the flexible member 28. Notice that the load remains substantially constant even while the motor 20 (FIG. 1) continues to apply torque to the flexible arm 28.

Figure 12:
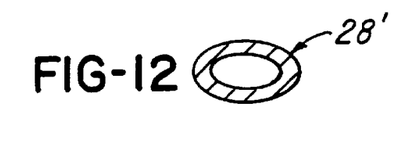
FIG. 12 is a sectional view taken along the line 12—12 in FIG. 10.
Figure 13:
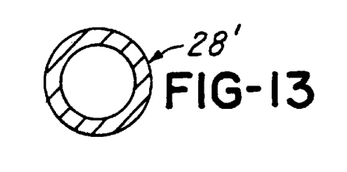
FIG. 13 is a sectional view taken along the line 13—13 in FIG. 11.

FIGS. 10–13 illustrate another embodiment of the invention with like parts being identified with the same part numbers, except that a "prime" mark ("'") has been added thereto. In this embodiment, the flexible arm 28' is generally circular in cross-section (as shown in FIG. 13) and comprises a plurality of areas of flex 62' at areas where the flexible member 28' defines an oval shape in cross section, as shown in FIG. 12. The points of weakness permit the flexible member 28' to flex at the areas 62' when the compressive load exceeds the predetermined load, such as 30 percent higher than a maximum working load of the flexible member 28'. Notice that the flexible member 28' defines a length L3 (FIG. 10) which is greater than the length L4 shown in FIG. 11. It has been found that the difference between the length L3 and length L4, as well as the difference between length L1 and length L2 referred to in the embodiment described above, is directly proportional to the arcuate distance the drive motor 20 continues to drive the drive plate 24 (FIG. 1).

While the method herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A windshield wiper drive linkage for use in a wiper system comprising:
   a plurality of linkage arms;
   at least one of said plurality of linkage arms comprising a flexible arm which bends to facilitate preventing damage to components in said wiper system when a compressive load applied to said at least one of said plurality of linkage arms exceeds a predetermined load as a result of a fatigue condition;
   wherein said flexible arm comprises a first end and a second end, said first and second ends each comprising a connector; at least one of said connectors having a shear groove and being capable of separating from said first or second end if said compressive force exceeds a maximum load for said flexible arm.

2. The windshield wiper drive linkage as recited in claim 1 wherein said flexible arm comprises a length of approximately 250 mm or more.

3. The windshield wiper drive linkage as recited in claim 1 wherein said flexible arm is rectangular in cross section.

4. The windshield wiper drive linkage as recited in claim 1 wherein said flexible arm has a first end coupled to a drive arm and a second end coupled to a driven arm;

said first end and said second end defining a first distance when said compressive load is less than said predetermined load and defining a second distance when said compressive load exceeds said predetermined load, wherein said second distance is less than said first distance.

5. The windshield wiper drive linkage as recited in claim 1 wherein said flexible arm shortens at least 25 mm after said compressive load exceeds said predetermined load.

6. The windshield wiper drive linkage as recited in claim 5 wherein said flexible arm is a fiber-reinforced composite or thermoset carrier.

7. The windshield wiper drive linkage as recited in claim 5 wherein said predetermined load is defined as:

$P_{CR}=KE=1.3P_{link}$; where:

$P_{CR}$=the predetermined load;

$P_{link}$=a maximum normal running load for a comparably-sized steel or rigid link which does not flex;

$$K \text{ is a coefficient} = \frac{\pi^2 I}{L^2};$$

E is the flexural modulus (MPa)
and I is a moment of inertia in mm$^4$
and L is a length (mm) of flexible arm (28).

8. The windshield wiper drive linkage as recited in claim 1 wherein said fatigue condition comprises a snow build-up when said wiper blades are being driven to either an inwipe or park position.

9. A wiper system comprising:
a first wiper;
a second wiper;
a windshield wiper drive linkage coupled to said first and second wipers;
a drive motor coupled to said windshield wiper drive linkage; and
said windshield wiper drive linkage comprising:
a plurality of linkage arms coupled to said first and second wipers and said drive motor;
at least one of said plurality of linkage arms comprising a flexible arm which bends to facilitate preventing damage to components in said wiper system when a compressive load applied to said at least one of said plurality of linkage arms exceeds a predetermined load as a result of a fatigue condition;
wherein said compressive load remains substantially constant as said flexible arm shortens at least 5 mm after said compressive load achieves said predetermined load.

10. The wiper system as recited in claim 9 wherein said flexible arm comprises a modulus of elasticity is at least 50,000 psi.

11. The wiper system as recited in claim 9 wherein said predetermined load is approximately 30 percent greater than a maximum working load.

12. The wiper system as recited in claim 11 wherein said flexible arm comprises a length of approximately 250 mm or more.

13. The wiper system as recited in claim 9 wherein said predetermined load is approximately 300 Newton.

14. The wiper system as recited in claim 9 wherein said flexible arm comprises a pultruded composite comprising glass fibers.

15. The wiper system as recited in claim 9 wherein said flexible arm is rectangular in cross section.

16. The wiper system as recited in claim 9 wherein said a flexible arm a first end coupled to a drive arm and a second end coupled to a driven arm;

said first end and said second end defining a first distance when said compressive load is less than said predetermined load and defining a second distance when said compressive load exceeds said predetermined load, wherein said second distance is less than said first distance.

17. The wiper system as recited in claim 9 wherein said flexible arm is a fiber-reinforced composite or thermoset material.

18. The wiper system as recited in claim 9 wherein said fatigue condition comprises a snow build-up when said wiper blades are being driven to either an inwipe or park position.

19. The wiper system as recited in claim 9 wherein said predetermined load is defined as:

$P_{CR}=KE=1.3P_{link}$; where:

$P_{CR}$=the predetermined load;

$P_{link}$=a maximum normal running load for a comparably-sized steel or rigid link which does not flex;

$$K \text{ is a coefficient} = \frac{\pi^2 I}{L^2};$$

E is the flexural modulus (MPa)
and I is a moment of inertia in mm$^4$
and L is a length (mm) of flexible arm (28).

20. A wiper system comprising:
a first wiper;
a second wiper;
a windshield wiper drive linkage coupled to said first and second wipers;
a drive motor coupled to said windshield wiper drive linkage; and
said windshield wiper drive linkage comprising:
a plurality of linkage arms coupled to said first and second wipers and said drive motor;
at least one of said plurality of linkage arms comprising a flexible arm which bends to facilitate preventing damage to components in said wiper system when a compressive load applied to said at least one of said plurality of linkage arms exceeds a predetermined load as a result of a fatigue condition;
wherein said flexible arm comprises a first end and a second end, said first and second ends are each over-molded with a connector, said ends comprising at least one shear groove such for enabling said connector to separate from said first or second end if said compressive force exceeds a maximum load for said flexible arm.

\* \* \* \* \*